(No Model.) 3 Sheets—Sheet 1.
W. RIEDEL.
CORN CONVEYER.
No. 449,703. Patented Apr. 7, 1891.
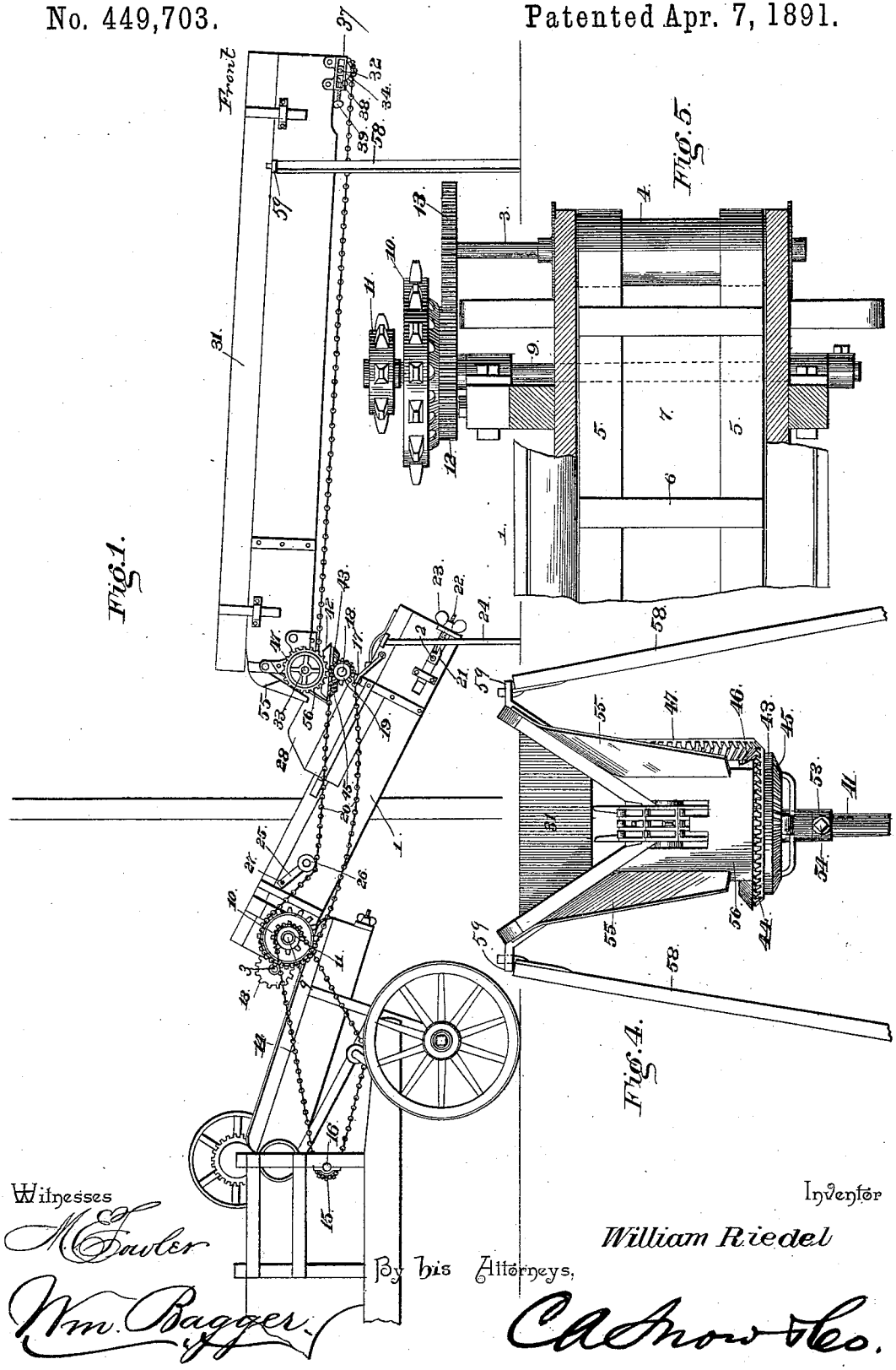
Witnesses
M. Fowler
Wm. Bagger
Inventor
William Riedel
By his Attorneys,
C. A. Snow & Co.

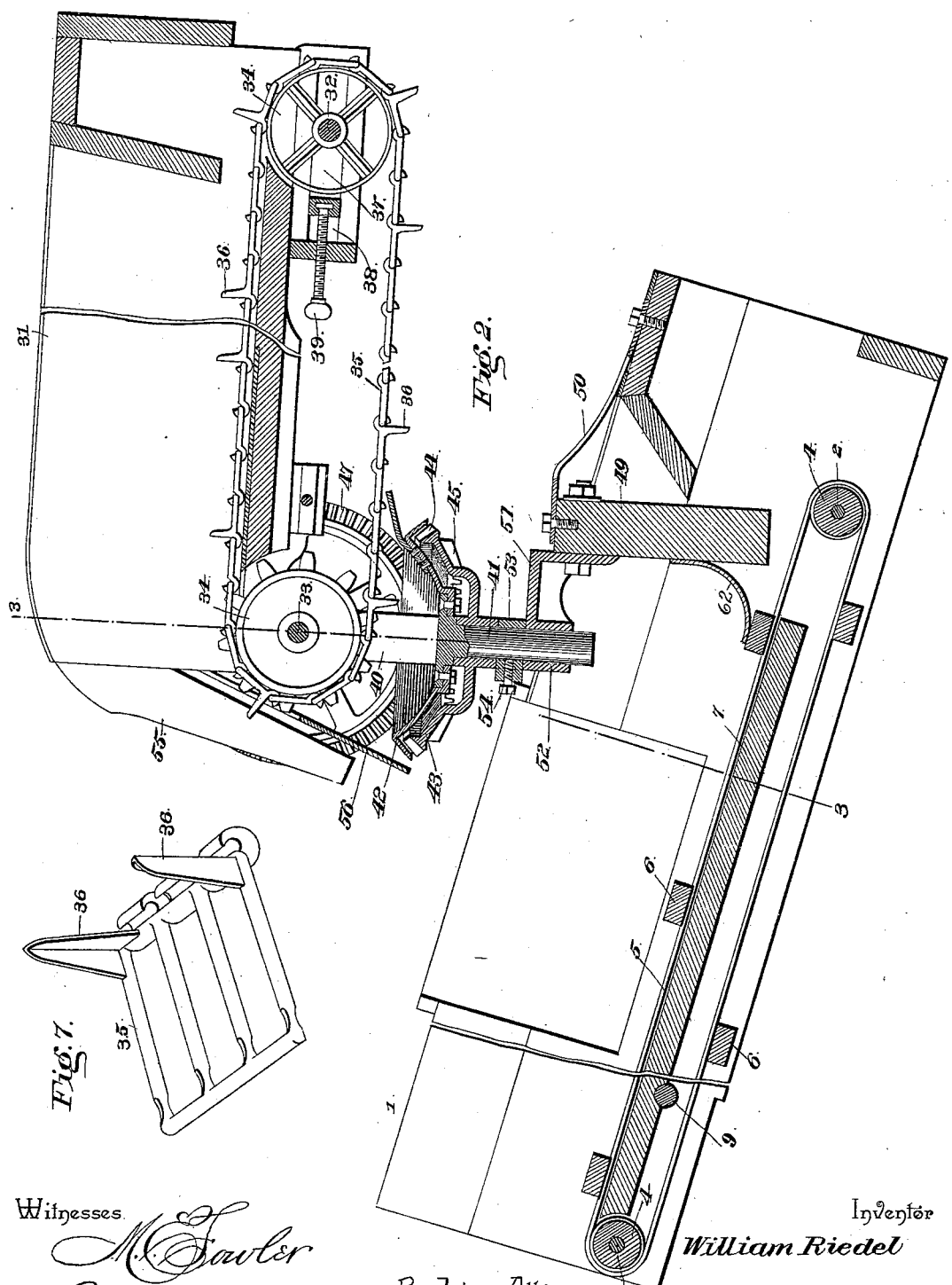

(No Model.) 3 Sheets—Sheet 3.
W. RIEDEL.
CORN CONVEYER.
No. 449,703. Patented Apr. 7, 1891.
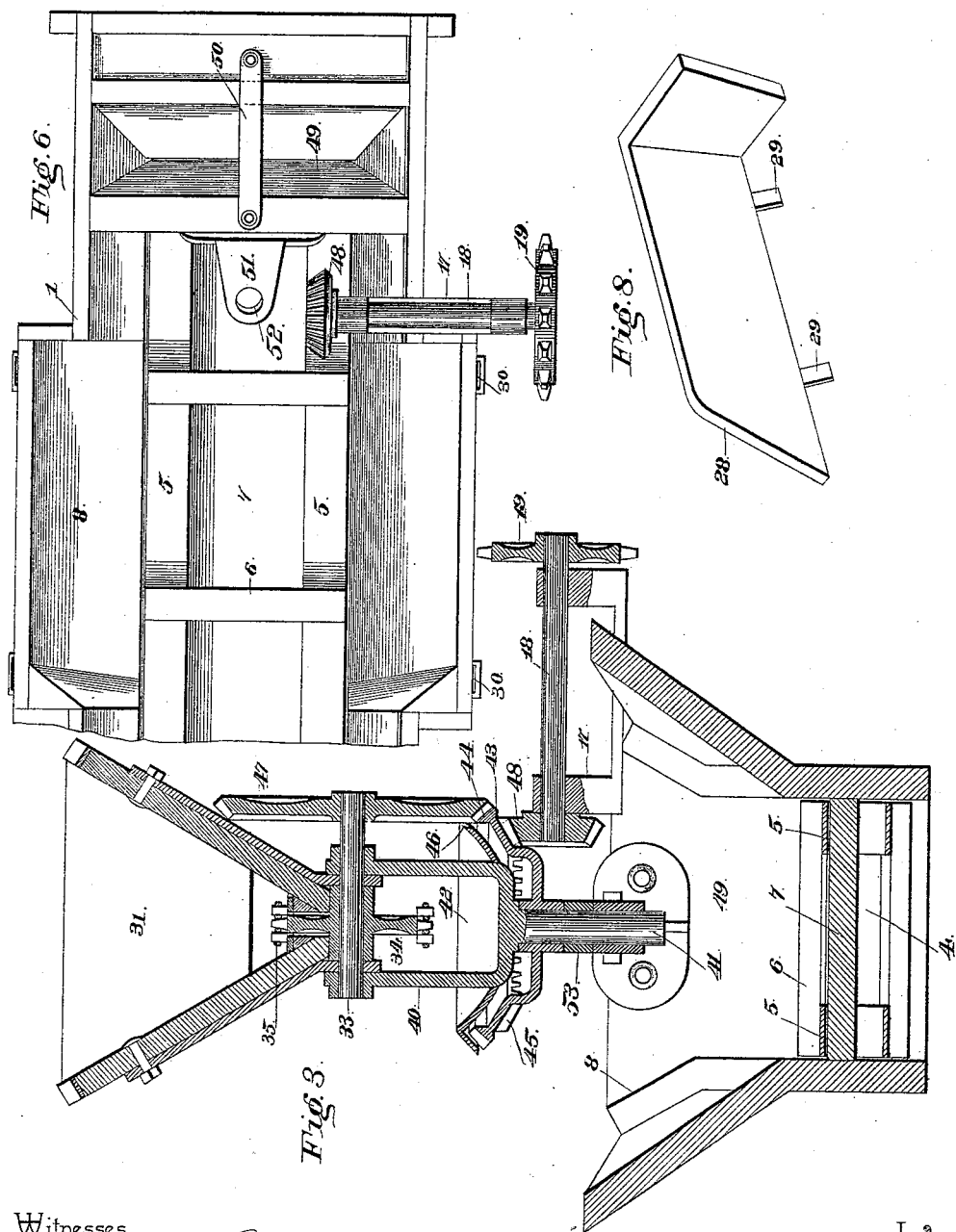
Witnesses
M. Fowler
Wm. Bagger
Inventor
William Riedel
By his Attorneys,
C. A. Snow & Co.

UNITED STATES PATENT OFFICE.

WILLIAM RIEDEL, OF BAKER, KANSAS.

CORN-CONVEYER.

SPECIFICATION forming part of Letters Patent No. 449,703, dated April 7, 1891.

Application filed June 12, 1890. Serial No. 355,230. (No model.)

*To all whom it may concern:*

Be it known that I, WILLIAM RIEDEL, a citizen of the United States, residing at Baker, in the county of Brown and State of Kansas, have invented a new and useful Corn-Conveyer, of which the following is a specification.

This invention relates to conveyers for ear-corn; and it has for its object to construct a device by means of which ear-corn may be carried from the crib or place where it is stored to the sheller in an easy and convenient manner and with the least possible expenditure of manual labor.

With these ends in view the invention consists in the improved construction, arrangement, and combination of parts, which will be hereinafter fully described, and particularly pointed out in the claims.

In the drawings, Figure 1 is a side view showing my improved conveyer attached to a corn-sheller in position for operation. Fig. 2 is a longitudinal sectional view. Fig. 3 is a transverse sectional view taken on the line 3 3 in Fig. 2. Fig. 4 is a rear end view of the supplemental carrier. Fig. 5 is a top plan view of the rear end of the main carrier. Fig. 6 is a top plan view of the end of the main carrier. Fig. 7 is a detail view of one of the links of the chain forming the endless conveyer in the supplemental carrier. Fig. 8 is a detail view of one of the side boards or removable flanges at the front end of the main carrier.

Like numerals of reference indicate like parts in all the figures.

1 designates a trough of suitable dimensions, which is provided at its front and rear ends with bearings for the transverse shafts 2 and 3, carrying rollers 4, over which passes an endless carrier, which may be constructed of belts or bands 5 5, connected by means of the transverse slats 6, which travel over the floor 7 in the bottom of the trough. The latter is widened or enlarged at its front end, so as to form the hopper 8, into which the ears of corn which are to be conveyed to the sheller may be either directly shoveled or where they may be deposited by means of the supplemental carrier to be hereinafter described.

The trough 1 is provided near its rear end with bearings for a transverse shaft 9, the outer end of which carries the sprocket-wheels 10 and 11 and the pinion 12, which latter meshes with a corresponding pinion 13 upon the end of the transverse shaft 3. The sprocket-wheel 11 is connected by a chain 14 with a sprocket-wheel 15 upon one of the driven shafts 16 of the corn-sheller, which is of ordinary construction, and a portion of which has been shown in Fig. 1 of the drawings.

The trough is provided near its front end with brackets 17, in which is journaled a transverse shaft 18, the outer end of which has a sprocket-wheel 19, which is connected by means of a chain 20 with the sprocket-wheel 10 upon the front carrier-shaft 3. Motion is in this manner communicated from the shaft 3 to the shaft 18, from which the supplemental carrier is driven in the manner to be hereinafter described.

The shaft 2 at the front end of the trough 1 is journaled in longitudinally-sliding boxes or blocks 21, through which extend the screws 22, which are provided at their outer ends with thumb-nuts 23. By tightening the latter the endless carrier mounted upon the shafts 2 and 3 may be tightened and all slack taken up, thus enabling the said carrier to work smoothly. The rear end of the trough is provided with suitable clamps or brackets for attaching it to the feed-chute of the corn-sheller.

To sustain the front end of the trough 1 at any desired elevation it is to be provided with legs or supports 24, which may be loosely jointed to the sides of said trough, as will be seen in Fig. 1 of the drawings.

To insure at all times a proper degree of tension upon the chain 20, I attach to the side of the trough 1 a pivoted arm 25, carrying a loose pulley 26, which bears against the said chain 20. It will be seen that by properly adjusting the pivoted arm 25, which latter may be retained in position by means of a set-screw 27, any desired degree of tension may be exerted upon the chain 20. The capacity of the hopper 8 may be increased by means of the auxiliary flanges 28, one of which has been shown detached in Fig. 8 of the drawings. Said auxiliary flanges are provided with depending arms or brackets 29, adapted to engage the staples 30 upon the sides of the hopper, to which the said flanges may thus be quickly and conveniently applied whenever desired.

31 designates the trough of the supplemental carrier. Said trough is provided at its front and rear ends with bearings for the transverse shafts 32 and 33, having the sprocket-wheels 34, upon which is mounted the endless chain 35. Several of the links of said chain are provided with outwardly-extending fingers 36, which are spaced a distance apart about equal to the usual length of an ear of corn. The pintles 36 are formed integrally with the links, from which they extend, and one of said links has been shown in detail in Fig. 7 of the drawings, by reference to which it will be seen that the fingers 36 are angular in cross-section, thereby making them sufficiently strong to resist the strain to which they in practice will be subjected. The shaft 32 at the front end of the trough 31 is mounted in blocks 37, which are arranged to slide in longitudinal slots or recesses 38 in the sides of the trough. Set-screws 39 are arranged to bear against the rear ends of the blocks 37, and it will be seen that by operating the said set-screws the block may be forced in a forward direction, thus tightening the endless chain or carrier to any desired extent.

Upon the shaft 33 at the rear end of the trough 31 is pivotally mounted a yoke or bail 40, from which depends a shaft 41. Upon the said shaft is secured a shield 42, under which is arranged a bevel-wheel 43, having two sets or series of teeth, denoted, respectively, by 44 and 45. The side of the shield 42 is provided with a notch 46, through which the teeth 44 mesh with a bevel-gear 47, mounted upon the shaft 33 of the endless carrier, to which motion is thus transmitted. The teeth 45 mesh with a bevel-pinion 48, which is mounted upon the inner end of the shaft 18, which is journaled in the brackets 17, attached to the trough 1. The latter is provided at its front end with a cross-piece 49, suitably secured by means of braces 50. The said cross-piece is attached to a rearwardly-extending casting 51, having a recess or socket 52, adapted to receive the shaft 41. A collar 53 is secured upon the latter below the bevel-wheel 43 by means of a set-screw 54. This collar serves to retain the bevel-wheel 43 in position below the shield 42 in such a manner that it may freely revolve upon the shaft, and thus serve to transmit motion from the pinion 48 upon the shaft 18 to the bevel-wheel 47 upon the shaft 33.

To the cross-piece 49 is attached a curved flexible shield 62, bearing loosely against the upper side of the endless carrier, mounted in the trough and serving to close the lower or front end of said trough, so as to prevent corn from dropping out.

The rear end of the trough 31 is provided with flanges 55 and with a depending lip 56, forming together a discharge-chute, over which the corn conveyed by the endless carrier is discharged into the trough 1.

From the foregoing description, taken in connection with the drawings hereto annexed, the operation and advantages of my invention will be readily understood.

Heretofore in shelling corn a considerable part of the labor has been required to carry the corn from the bed or bin to the sheller. Especially when the crib is a large one, the labor of several hands is required to shovel the corn from the inner end of the crib toward the forward end, and from thence into the feed-chute of the sheller.

By my invention the trough 1 is first attached to the feed-chute of the sheller, which has been backed up close to the crib. The ear-corn may then be shoveled into the said trough or conveyer, from whence it is delivered into the feed-chute of the sheller. When the corn has thus been removed from the forward portion of the crib, the supplemental carrier may be attached, and the corn may thus be conveniently removed from the inner end of the chain. The front end of the supplemental carrier may be supported by means of legs 58, which may be of suitable height and inserted detachably in staples 59 upon the sides of the trough 31. The latter, it will be observed, is connected with the carrier 1 by means of the shaft 41 only. It follows that it may be readily swung around at any desired angle to the trough 1, thus enabling the front end of said supplemental carrier to be swung around into any of the corners of the crib. The yoke 40, having the shaft 41, being mounted pivotally upon the shaft 33, it will also be seen that the front end of the trough 31 may be raised or lowered to any desired extent, thus enabling the supplemental carrier to be adjusted to whichever position shall be found most convenient.

By means of this device the labor of two or more hands may be dispensed with, only one man being required to shovel the corn into the carrier or conveyer, by means of which the corn is automatically delivered into the feed-chute of the sheller.

It is obvious that suitable bearings are to be provided for the shaft 9 upon the frame of the corn-sheller, thus enabling the feeder-trough 1 to be raised or lowered to any desired position. It will also be noticed that the said shaft is in front of the rear end of the carrier 1, which latter therefore overlaps the feed-chute of the corn-sheller.

I have in the foregoing described what I consider to be the most desirable construction of my invention; but I desire it to be understood that I reserve the privilege to make any changes and modifications in the construction thereof which may be resorted to without departing from the spirit of my invention.

Having thus described my invention, I claim—

1. The combination, with a corn-sheller, of a conveyer having an endless carrier, said conveyer being attached to the front end of said sheller and with its free end movable in a vertical plane, and an auxiliary conveyer attached to the front end of the main conveyer and with its free end movable vertically and laterally, whereby the said auxiliary conveyer may be adjusted to various positions within a corn crib or bin, substantially as and for the purpose herein set forth.

2. The combination, with a corn-sheller, of a conveyer attached thereto, with its free end movable in a vertical plane and having an endless carrier, flanges 28, forming a hopper, and the curved flexible shield or guide 62, bearing loosely against the endless carrier, an auxiliary conveyer attached to the main conveyer, with its free end movable vertically and laterally and having an endless carrier and spout 55, and legs or supports for the free ends of said main and auxiliary conveyers, substantially as and for the purpose herein set forth.

In testimony that I claim the foregoing as my own I have hereunto affixed my signature in presence of two witnesses.

WILLIAM RIEDEL.

Witnesses:
L. E. MARTIN,
JOHN L. MERRILL.